March 13, 1962  B. D. MONTGOMERY  3,024,876
VEHICLE RETARDER
Filed April 25, 1960  3 Sheets-Sheet 1
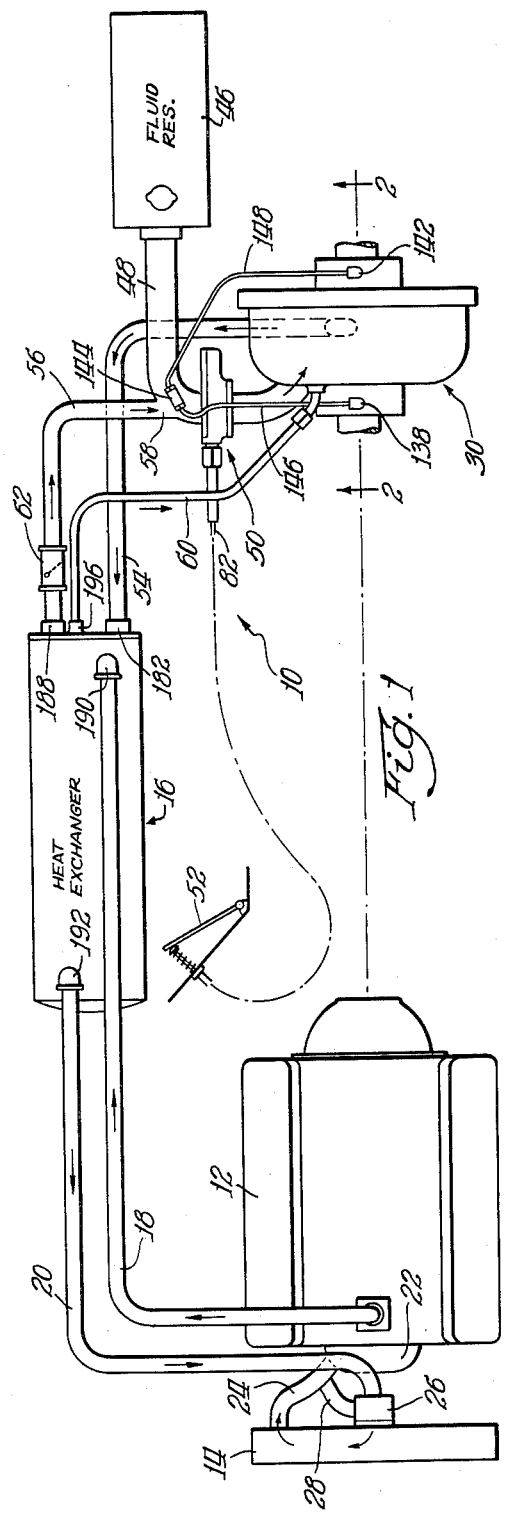
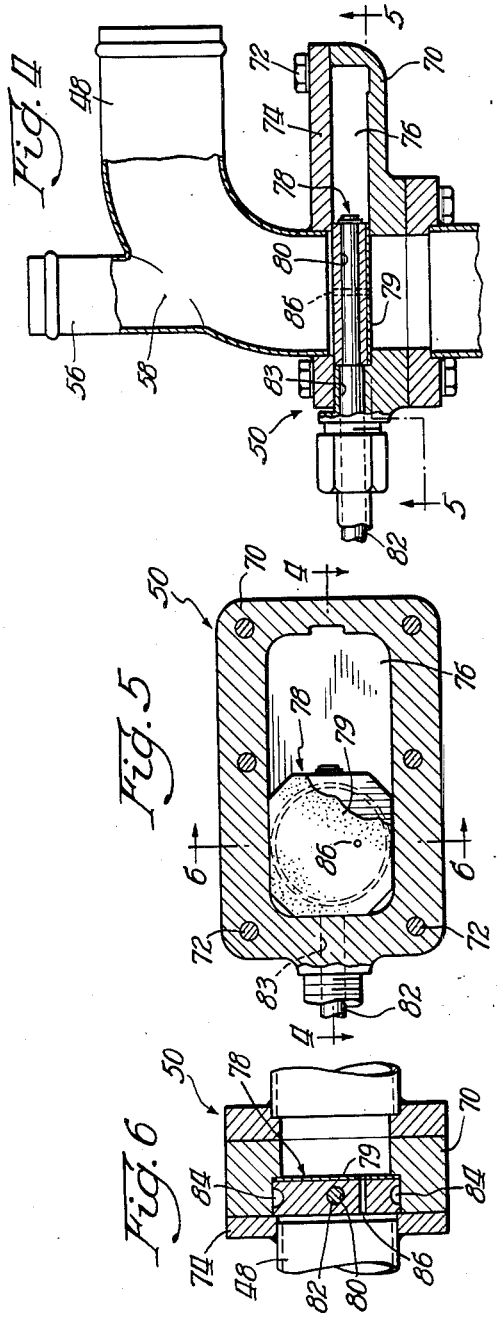
Inventor:
Byron D. Montgomery

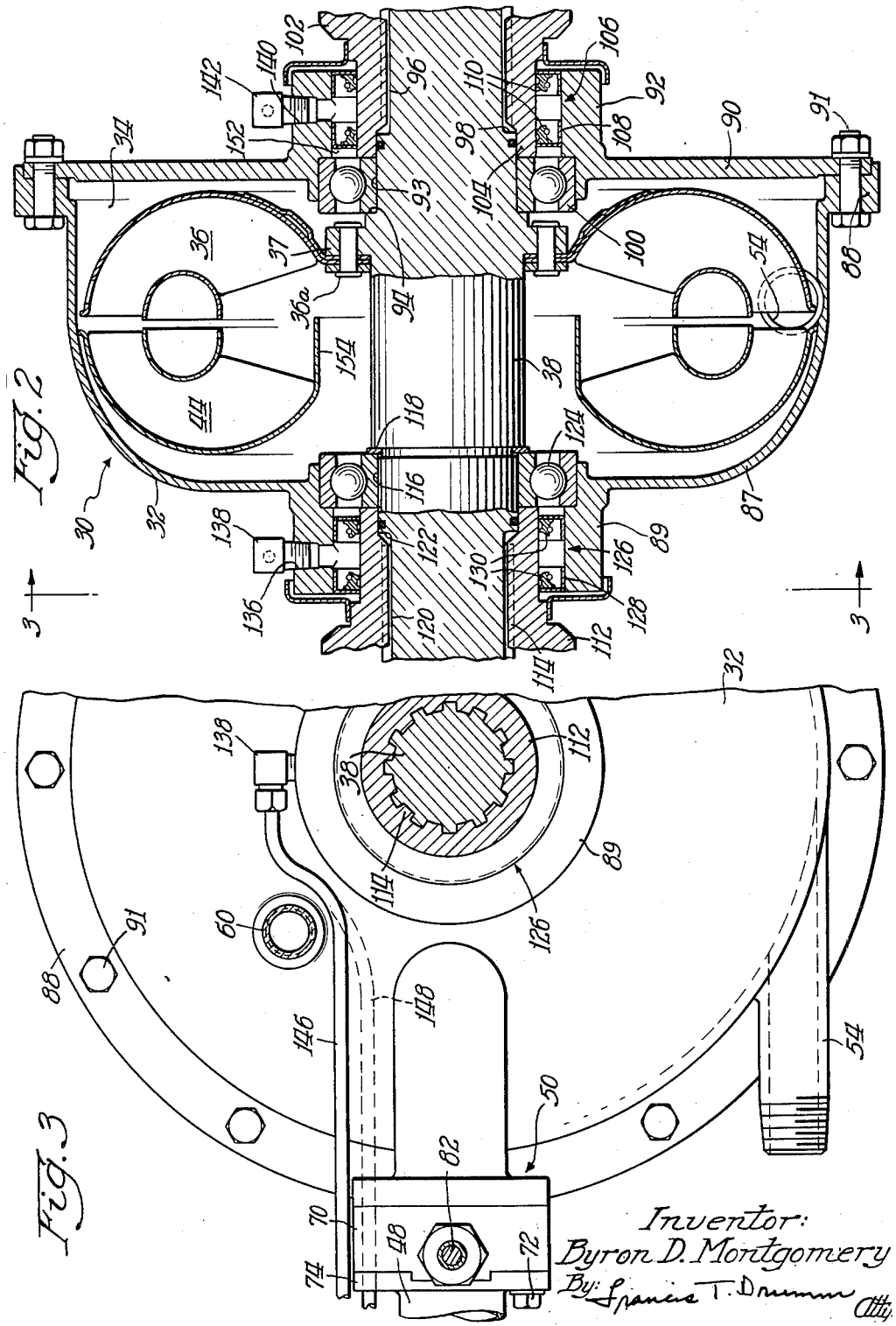

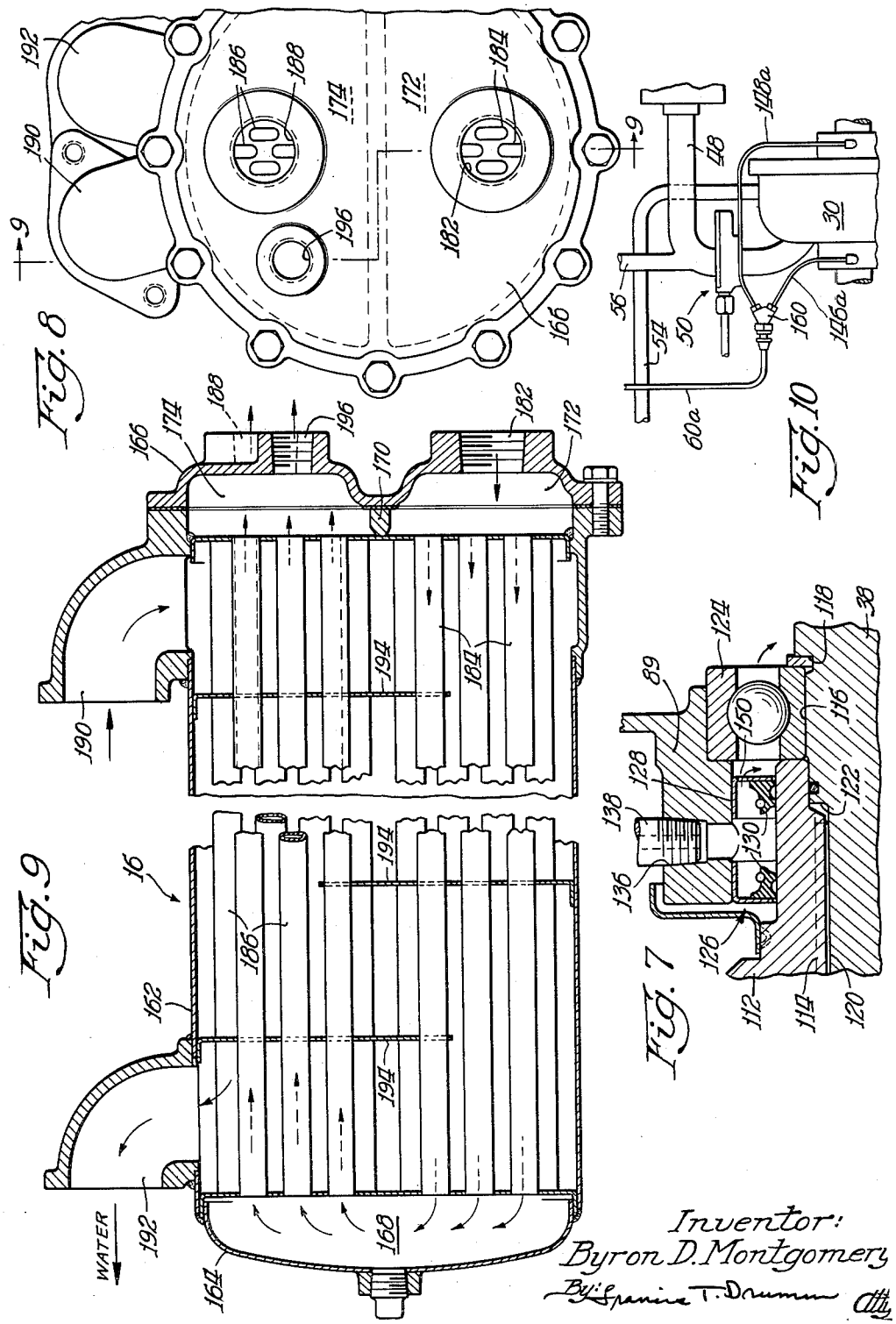

United States Patent Office 3,024,876
Patented Mar. 13, 1962

3,024,876
VEHICLE RETARDER
Byron D. Montgomery, Berkley, Mich., assignor to Borg-Warner Corporation, Chicago, Ill., a corporation of Illinois
Filed Apr. 25, 1960, Ser. No. 24,332
3 Claims. (Cl. 188—90)

This application relates to vehicle brakes and more particularly to a vehicle brake of the hydraulic coupling or hydraulic retarder type. This application is a continuation-in-part of applicant's copending application S.N. 753,817, Vehicle Brake, filed August 7, 1958.

A primary object of the invention is to provide an improved hydraulic retarder of the general type described and claimed in applicant's copending application.

Another object of the invention is to provide a hydraulic retarder of the type having a housing defining a closed chamber and rotor connected to a vehicle drive line element, a stator affixed within the chamber, a reservoir for supplying fluid to the chamber, a heat exchanger, conduit means interconnecting the chamber with the cooler, bearings positioned within the housing, and novel means for lubricating the bearings.

Another object of the invention is to provide vehicle retarder of the stated type in which novel means are provided for controlling the flow of fluid from the reservoir to the chamber.

A further object of the invention is to provide a vehicle retarder of the character described, wherein a novel valve is provided to control the flow of fluid to the chamber and wherein novel means are provided for bypassing the valve when the valve is in a closed position to assure cooling of residual fluid.

A further object of the invention is to provide a hydraulic vehicle retarder system in which novel means are provided for assuring a partial vacuum for rapid fill of the retarder chamber under all conditions of operation.

Another object of the invention is to provide a vehicle retarder of the mentioned type in which means are provided for bleeding fluid into the retarder chamber during sustained periods of vehicle inactivity so that a partial vacuum is available for rapid filling of the retarder chamber and instantaneous retardation immediately after the vehicle is placed in operation.

A further object of the invention is to provide a vehicle retarder system of the hydraulic type in which injector means are provided to assure rapid filling of the retarder chamber.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is a diagrammatic view of a hydraulic retarder system made in accordance with the present invention and showing the relationship thereof to the cooling system of an automotive vehicle;

FIGURE 2 is an enlarged elevational sectional view of the retarder forming a part of the system illustrated in FIGURE 1;

FIGURE 3 is an elevational end view taken substantially on line 3—3 of FIGURE 2;

FIGURE 4 is an enlarged elevational sectional view of the flow control valve and injector arrangement forming a part of the system of FIGURE 1;

FIGURE 5 is an enlarged sectional plan view of the flow control valve of FIGURE 4 taken substantially on line 5—5 of that figure;

FIGURE 6 is an elevational sectional view taken substantially on line 6—6 of FIGURE 5;

FIGURE 7 is a greatly enlarged fragmentary vertical sectional view of a detail of the lubrication arrangement for the retarder housing;

FIGURE 8 is an elevational end view of the oil cooler shown in FIGURE 1;

FIGURE 9 is an elevational sectional view partly broken away, of the heat exchanger of FIGURE 8 taken substantially on line 9—9 of that figure; and FIGURE 10 is a fragmentary diagrammatic view of a modified form of the present invention.

Referring to the drawings and more particularly to FIGURE 1 the hydraulic retarder of the present invention is indicated generally by reference normally 10 and is illustrated in association with a vehicle engine 12, a conventional vehicle liquid-to-air heat exchanger or radiator 14, and a secondary heat exchanger 16, of the liquid-to-liquid type, to which engine coolant flows thru a conduit 18 and from which engine coolant flows by means of a conduit 20. The heat exchanger 16, as will be hereafter apparent, functions to cool fluid received from the retarder system. Indicated by reference 22 is a water pump which supplies pressure to the engine coolant in conventional manner. The pump 22 forces coolant thru the engine cooling jacket, then thru the conduit 18 into the heat exchanger 16 from which it normally returns thru the conduit 20 to a thermostat 26 and then into the radiator 14. The coolant passing thru the radiator 14 is drawn into the suction side of the pump 22 through a conduit 24. When cooling of the coolant is not required it is bypassed by means of the thermostat 26 through conduit 28 to the suction side of the pump 22.

Retarder system 10 includes a retarder unit 30 having a housing 32 forming a toroidal chamber 34 within which is arranged a rotor 36 illustrated in FIGURE 2 as secured by means of rivets 36a to a flange 37 integrally formed with a drive shaft 38. Arranged within the chamber 34 in confronting relation to the rotor 36 is a stator 44 which may be secured by any suitable means, such as by welding or the like, to the housing 32. The rotor 36 and the stator 44 are of the vaned type and are preferably of stamped metal construction. It is preferable that the vanes of the rotor 36 and the stator 44 be of extreme curvature. For instance, the vanes may have an angle of 45° at the outer edges and an angle of 58° at their inner edges with reference to a plane passing through the axis of rotation. Hydraulic fluid may be initially supplied to the chamber 34 from a reservoir or tank 46 by means of a conduit 48 (FIG. 1). The supply of fluid may be controlled by a valve 50 actuatable by any suitable means, such as mechanical linkages or the like, by a foot pedal 52 on the floor of the vehicle cab.

The fluid may be discharged from the chamber 34 by means of a conduit 54 through which the fluid flows to the heat exchanger 16. When the valve 50 is open the fluid circulates through the heat exchanger 16 and is discharged through a conduit 56 which connects at 58 with conduit 48. Assuming the valve 50 to be in an open position, the fluid normally flows in a closed loop circuit from the chamber 34 to the heat exchanger 16 then back. There is no direct flow of fluid from the tank 46 and, consequently, very little air is introduced into the fluid circuit and fading is substantially reduced. The tank 46 holds only enough fluid to provide adequate fill for the closed loop system when the control valve 50 is in an open position plus some reserve for any leakage that may occur.

When the control valve 50 is returned to a closed position, the fluid in the retarder is pumped out by the pumping action of the rotor 36 and fills the conduit 54 then the heat exchanger 16. Surplus fluid flows back into the tank 46. A relatively small quantity of fluid remains in the chamber 34 despite the pumping action of the rotor 36. In the past, difficulty has been experienced because of the excessive heat developed by the churning of this small amount of fluid within the compartment because of rotation of the rotor 36 while the retarder 30 is inoperative. To overcome this difficulty a bypass conduit 60 extends between the outlet site of the heat exchanger 16 and the chamber 34 to provide a closed loop flow of this residual fluid from the chamber 34 through the heat exchanger 16, where heat is removed by the primary coolant from the engine cooling system. The manner of circulation of retarder fluid through the heat exchanger 16 will be hereafter described in detail.

According to an important feature of the present invention, means are provided for assuring the quick release of fluid from the tank 46 to the chamber 34 when the valve 50 is in an open position. As pointed out previously, the chamber 34 is substantially evacuated by the pumping action of the rotor 36 so that a partial vacuum results. To provide an additional force assuring rapid movement of fluid from the tank 46, the conduit 56 is smaller in diameter than the conduit 48. As a result, a low pressure area is formed at 58 and fluid flows by injector action to the left in conduit 48 even in the absence of a gravity head.

As mentioned previously, FIGURE 1 is diagramatic in nature. In an actual vehicle installation the heat exchanger 16 and the tank 46 are preferably arranged side by side within the vehicle chassis side rails. When the valve 50 is in a closed position back flow of fluid from the tank 46 to the heat exchanger 16 is prevented by a check valve 62. During the inoperative periods of the retarder, as will be understood, a limited circulation of fluid is effective between the heat exchanger 16 and the chamber 34 through the bypass conduit 60, the impetus being supplied by the rotor 36. During normal use of the vehicle the evacuation of the chamber 34 effects a partial vacuum in the chamber so that when the valve 50 is moved to an open position the chamber is immediately filled. During sustained periods of vehicle inactivity this partial vacuum is inevitably lost. According to the present invention means are provided for bleeding fluid to the chamber 34 during these sustained periods of idleness so that the initial opening of the valve 50 removes the accumulated fluid and a low pressure condition is reestablished for instant filling as required.

Referring now more particularly to FIGURES 4, 5 and 6, the valve 50 is shown as including a casing 70 to which is secured, by means of capscrews 72 a coverplate 74. Formed within the casing 70 is a chamber 76 in which is slidably received a gate 78 having a central bore 80 for reception of a rod 82.

The downstream side of the gate 78 is provided with a low friction coating 79 of Teflon or the like. The rod 82 is slidably received in an opening 83 in the housing 70. The gate 78 may be moved from the closed position illustrated in these figures to the open position, to the right as used in FIGURES 4 and 5, by the push rod 82 which may be actuated by the pedal 52 in any suitable manner. Elongated grooves 84 are formed in each side of the gate 78 to assure equalization of fluid pressures. When the gate 78 is in the closed position as illustrated in the FIGURES 4 and 5 and the vehicle is inoperative for sustained periods of time, the chamber 34 may be filled through a bleed hole 86. As previously explained the fluid passing into the chamber 34 in this manner may be instantly removed for re-establishing a low pressure condition merely by sliding the gate 78 to the right, as viewed in FIGURE 4.

Referring now more particularly to FIGURES 2, 3 and 7, the housing 32 comprises a first section 87 of concave configuration having a radially extending flange 88 and an axially extending hub 89. A second section 90 is of an annular configuration and is secured at its outer marginal edge, by means of circumferentially spaced bolts 91, to the flange 88. Integrally formed with the second section 90 is an annular hub 92. The shaft 38 is formed with a reduced portion 93 defined by a shoulder 94 and a splined reduced portion 96 defined by a shoulder 98. A ball bearing 100 is interposed between the hub 92 and the reduced portion 93. An internally splined output sleeve 102 is received on the splined reduced portion 96 and has an integrally formed ledge 104 resting on the reduced portion 93. Arranged between the splined output 102 and the hub 92 is a fluid seal 106 having an annular casing 108 of channel configuration and a pair of resilient sealing rings 110.

Drive is transmitted to the shaft 38 by means of an input sleeve 112 internally splined at 114. The left end of the shaft 38, as viewed in FIGURE 2, is provided with a reduced portion 116 defined by shoulder 118 and a reduced portion 120 defined by shoulder 122. The reduced portion 120 is splined to be received within the sleeve 112. A ball bearing 124 is arranged between the hub 89 and reduced portion 116.

Between the hub 89 and the sleeve 112 is a seal 126 having an annular casing 128 of channel configuration and a pair of annular resilient sealing rings 130. According to the present invention means are provided for lubricating the bearings 124 and 100. To this end, the hub 89 is formed with a threaded opening 136 for reception of a fitting 138 and the hub 92 is formed with a threaded opening 140 for reception of a fitting 142. A T-fitting 144 is received in an opening in the conduit 48 for flow of fluid between the conduit 48 and the bearings 124 and 100 through conduits 146 and 148. To afford fluid access to the bearings 124 the casing 128 is provided with an opening 150 and the casing 108 is formed with an opening 152. A limited amount of fluid passes through the bearings 124 and 100 at all times. Fluid passing through bearing 124 is directed into the rotor 36 by means of an annular director ring 154 secured to the stator 44.

In FIGURE 10 is shown a modified form of the present invention in which a bypass conduit 60a replaces bypass conduit 60 and connects with a Y-fitting 160 for distribution of fluid to the bearings 124 and 100 through conduits 146a and 148a.

Referring now to FIGURES 9 and 10, the heat exchanger 16 is formed with a body portion 162 and generally concave end plates 164 and 166. The end plate 164 defines an exchange chamber 168 and the end plate 166 is divided by a partition 170 into an inlet section 172 and an outlet section 174. Fluid from the retarder chamber may flow from retarder 34 to an inlet 182 to the chamber 172 and then through a plurality of tubes 184 to the chamber 168, and then through outlet tubes 186, outlet port 188 and conduit 56 back to the retarder chamber 34. Engine coolant enters the heat exchanger 16 by means of an inlet 190 and leaves by means of an outlet 192. The coolant is directed into a tortuous path through the heat exchanger 16 by means of a plurality of staggered partitions 194. When the valve 50 is in the closed position, oil leaves the chamber 174 and passes into the conduit 60 through outlet port 196.

The above described retarder system exhibits important advantages over the retarder arrangements heretofore known. For instance, the present retarder is characterized by instantaneous filling because of the low pressure existing in the chamber 34 and because of the injector action created by the juncture of the conduit 56 at the bend in the conduit 48. The lubrication arrangements shown in FIGURE 1 assures adequate lubrication for the bearings 100 and 124 and the conduits 146 and 148 function also to bypass residual fluid when valve 50 is in the closed position. In the arrangement shown in FIGURE 10 all of the fluid is bypassed to the chamber 34 by means of conduits 146a and 148a. The coating 79 on the downstream side of the gate 78 permits free sliding of the gate 78 as required.

While the invention is described in connection with certain specific embodiments thereof, it is to be understood that this is by way of illustration and not by way of limitation and the scope of my invention is defined solely by the appended claims which should be construed as broadly as the prior art will permit.

I claim:

1. A vehicle retarder system comprising a housing defining a chamber, a shaft extending through said chamber and adapted to be rotated by the vehicle engine, a vaned rotor fixed to said shaft within said housing, bearings interposed between said housing and said shaft, a stator fixedly mounted in said chamber in confronting relation to said rotor, a heat exchanger having an inlet side and an outlet side, a conduit connecting said chamber to the inlet side of said heat exchanger, a reservoir, a second conduit connecting said reservoir and said chamber, a third conduit connecting the outlet side of said heat exchanger and said second conduit, a control valve arranged in said second conduit for controlling the flow of fluid to said chamber, a check valve in said third conduit to prevent back flow of fluid from said reservoir to said heat exchanger when said control valve is in a closed position, a bypass conduit bypassing said control valve and said check valve having a pair of branch conduits for supplying a limited quantity of fluid from said heat exchanger to said chamber through said bearings, said rotor being operative to create a low pressure condition in said chamber when said control valve is in a closed position, said third conduit being of less diameter than said second conduit, said low pressure condition operative such that when said control valve is in an opened position fluid preferentially flows from said reservoir into said chamber.

2. A vehicle retarder system comprising a housing defining a chamber, a shaft extending through said chamber and adapted to be rotated by the vehicle engine, a vaned rotor fixed to said shaft within said housing, bearings interposed between said housing and said shaft, stator vanes fixedly mounted within said chamber in confronting relation to said rotor, a heat exchanger having an inlet side and an outlet side, a conduit connecting said chamber to said inlet side of said heat exchanger, a reservoir, a second conduit connecting said reservoir and said chamber, a third conduit connecting said outlet side of said heat exchanger and said second conduit, a control valve arranged in said second conduit for controlling the flow of fluid into said chamber, a check valve in said third conduit to prevent the back flow of fluid from said reservoir to said heat exchanger when said control valve is in a closed position, a by-pass conduit by-passing said control valve and said check valve for supplying a limited quantity of fluid from said heat exchanger to said chamber, said rotor being operative to create a low pressure condition in said chamber when said control valve is in a closed position, said low pressure condition being operative such that when said control valve is in an open position fluid preferentially flows from said reservoir into said chamber, and means for supplying fluid from a point upstream from said control valve to said chamber when said vehicle is stationary and said control valve is in a closed position.

3. A vehicle retarder system comprising a housing defining a chamber, a shaft extending through said chamber and adapted to be rotated by the vehicle engine, a vaned rotor fixed to said shaft within said housing, bearings interposed between said housing and said shaft, a stator fixedly mounted in said chamber in confronting relation to said rotor, a heat exchanger having an inlet side and an outlet side, a conduit connecting said chamber to the inlet side of said heat exchanger, a reservoir, a second conduit connecting said reservoir and said chamber, a third conduit connecting the outlet side of said heat exchanger and said second conduit, a control valve arranged in said second conduit for controlling the flow of fluid to said chamber, a check valve in said third conduit to prevent back flow of fluid from said reservoir to said heat exchanger when said control valve is in a closed position, a by-pass conduit by-passing said control valve and said check valve interconnecting the outlet side of said heat exchanger and said chamber, said by-pass conduit providing a supply of fluid for lubricating said bearings, said rotor being operative to create a low pressure condition in said chamber when said control valve is closed, said third conduit being of less diameter than said second conduit, said low pressure condition being operative such that when said control valve is in an opened position fluid preferentially flows from said reservoir into said chamber, and means for supplying fluid from a point upstream from said control valve to said chamber when said vehicle is stationary and said valve is in a closed position.

References Cited in the file of this patent

UNITED STATES PATENTS

| | | |
|---|---|---|
| 2,035,576 | Taylor | Mar. 31, 1936 |
| 2,226,558 | Fitzpatrick | Dec. 31, 1940 |
| 2,287,130 | Ramey | June 23, 1942 |
| 2,453,877 | Trail | Nov. 16, 1948 |
| 2,748,900 | Booth et al. | June 5, 1956 |
| 2,827,133 | Schneider | Mar. 18, 1958 |
| 2,827,989 | Christensen | Mar. 25, 1958 |
| 2,889,013 | Schneider | June 2, 1959 |